United States Patent
Reynolds et al.

[11] Patent Number: 6,095,723
[45] Date of Patent: Aug. 1, 2000

[54] ENGRAVING TOOL AND METHOD FOR FORMING

[75] Inventors: Ellis Melvin Reynolds, Hicksville, Ohio; Howard Dean Trosper, Leo, Ind.

[73] Assignee: NEMCO Medical, Hicksville, Ohio

[21] Appl. No.: 09/233,671

[22] Filed: Jan. 19, 1999

[51] Int. Cl.[7] .............................. B23B 27/14; B23B 27/06
[52] U.S. Cl. .............................. 407/54; 407/65; 407/62; 408/228; 409/234
[58] Field of Search ................ 407/54, 33, 113, 407/114, 115, 65; 408/228, 229, 226, 238, 239 R; 409/79, 234; 101/152, 153; 30/164.95

[56] References Cited

U.S. PATENT DOCUMENTS

| | | | |
|---|---|---|---|
| 2,354,985 | 8/1944 | Davis | 408/228 |
| 3,116,645 | 1/1964 | Nider | 408/228 |
| 3,121,351 | 2/1964 | Mount | 408/228 |
| 3,840,104 | 10/1974 | Groppini | 197/6.7 |
| 3,903,599 | 9/1975 | Ray | 30/362 |
| 3,964,491 | 6/1976 | Bailey et al. | 33/23 R |
| 4,448,120 | 5/1984 | Richardson et al. | 101/32 |
| 4,834,595 | 5/1989 | Cacciotti | 409/80 |
| 5,029,011 | 7/1991 | Fraser | 358/299 |
| 5,362,183 | 11/1994 | Alario et al. | 407/65 X |
| 5,397,204 | 3/1995 | Grenier et al. | 409/234 |
| 5,569,003 | 10/1996 | Goldman et al. | 409/132 |

FOREIGN PATENT DOCUMENTS

| | | | |
|---|---|---|---|
| 0130759 | 5/1978 | Germany | 407/115 |

*Primary Examiner*—Henry W. H. Tsai
*Attorney, Agent, or Firm*—Emch, Schaffer, Schaub & Porcello Co.

[57] ABSTRACT

An engraving tool includes an end portion extending to a tip, a pair of flutes in the end portion and wall sections between the flutes. The wall sections are ground in the area of the tip to form surfaces having cutting edges and facets disposed at specific angles relative to a plane perpendicular to axis.

9 Claims, 4 Drawing Sheets

ENGRAVING TOOL AND METHOD FOR FORMING

BACKGROUND OF THE INVENTION

The present invention is directed to an engraving tool for cutting shapes, patterns, letters or the like on surfaces of metal, such as brass, steel or copper, plastic or marble or other stone and to a method for forming or grinding such engraving tool.

Prior art engraving tools formed of metal have limitations on the speed at which the engraving may be performed and the amount of use which may be had from such tool before it wears to an unacceptable degree. Engraving tools having diamond or other precious stone tips provide some improvement in speed of operation and length of life. U.S. Pat. Nos. 4,448,120 and 5,397,204 show two types of prior art engraving tools.

The engraving tool of the present invention is all metal and, yet, by virtue of its design, it has the capability of engraving part numbers and other designs on a wide variety of materials, including all types of stainless steel, at feed rates of up to five times faster than the feed rates of conventional types of engraving tools. It is capable of being used with no coolant and has a significantly longer life than conventional types of engraving tools. The design of the tool, including the tip profile design, allows for larger shavings and clearance for such shavings to be removed during the process of engraving. Additionally, the tip profile design provides enhanced rigidity and thus longer tool life. It also improves the ability of the tool to follow precisely the desired line of engraving and greatly enhances the quality of engraving.

IN THE DRAWINGS

DESCRIPTION OF THE INVENTION

Figure 1:
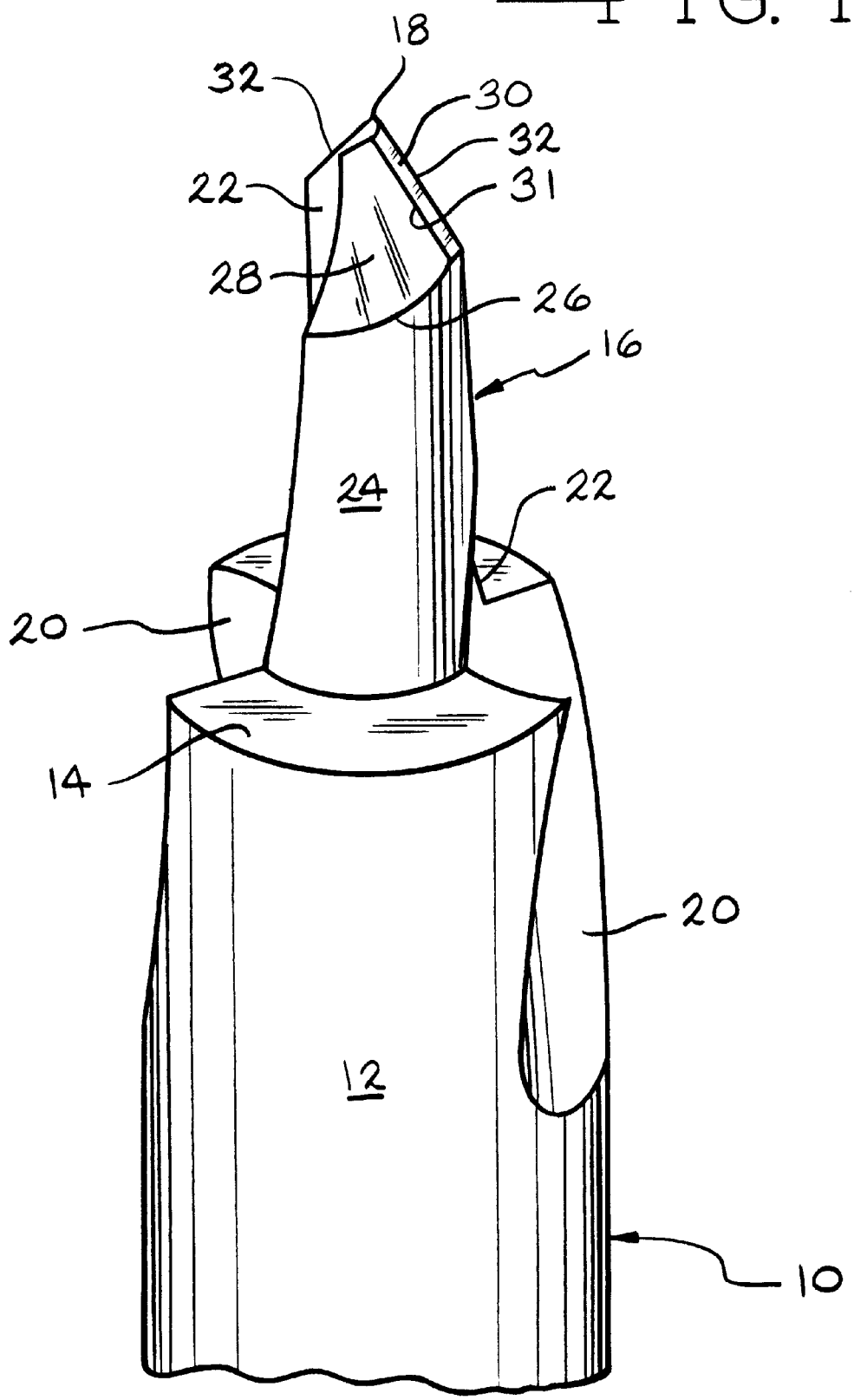
FIG. 1 is a perspective view of the engraving tool of the present invention.

Referring to the drawings, there is shown an engraving tool 10 having a shaft 12 extending along an axis A to a shoulder 14 disposed at a substantially a right angle to the axis A. Extending outwardly from the shoulder 14, generally along the axis A, is an end portion 16. The end portion 16 terminates at a tip 18 which preferably is on the axis A. A pair of flutes 20 are formed in that portion of the shaft 12 immediately adjacent the shoulder 14. The flutes 20 are positioned on opposite sides of the axis A from one another.

The engraving tool 10 may be formed from a workpiece 60 (see FIGS. 4 and 5) such as a 0.25 inch center drill formed of carbide steel by grinding to the shape disclosed herein. For example, the work piece 60 could be a combined drill and countersink such as that sold by ULTRA Tool International Inc., Huntington Beach, Calif., under its Part No. 560 390. The diameter could be larger or smaller than 0.25 inch. For an engraving tool 10 have a shaft with a diameter of 0.25 inch, the axial length of the end portion 16 from the shoulder 14 to the tip 18 is preferably on the order of 0.275±0.030 inch.

Figure 2:
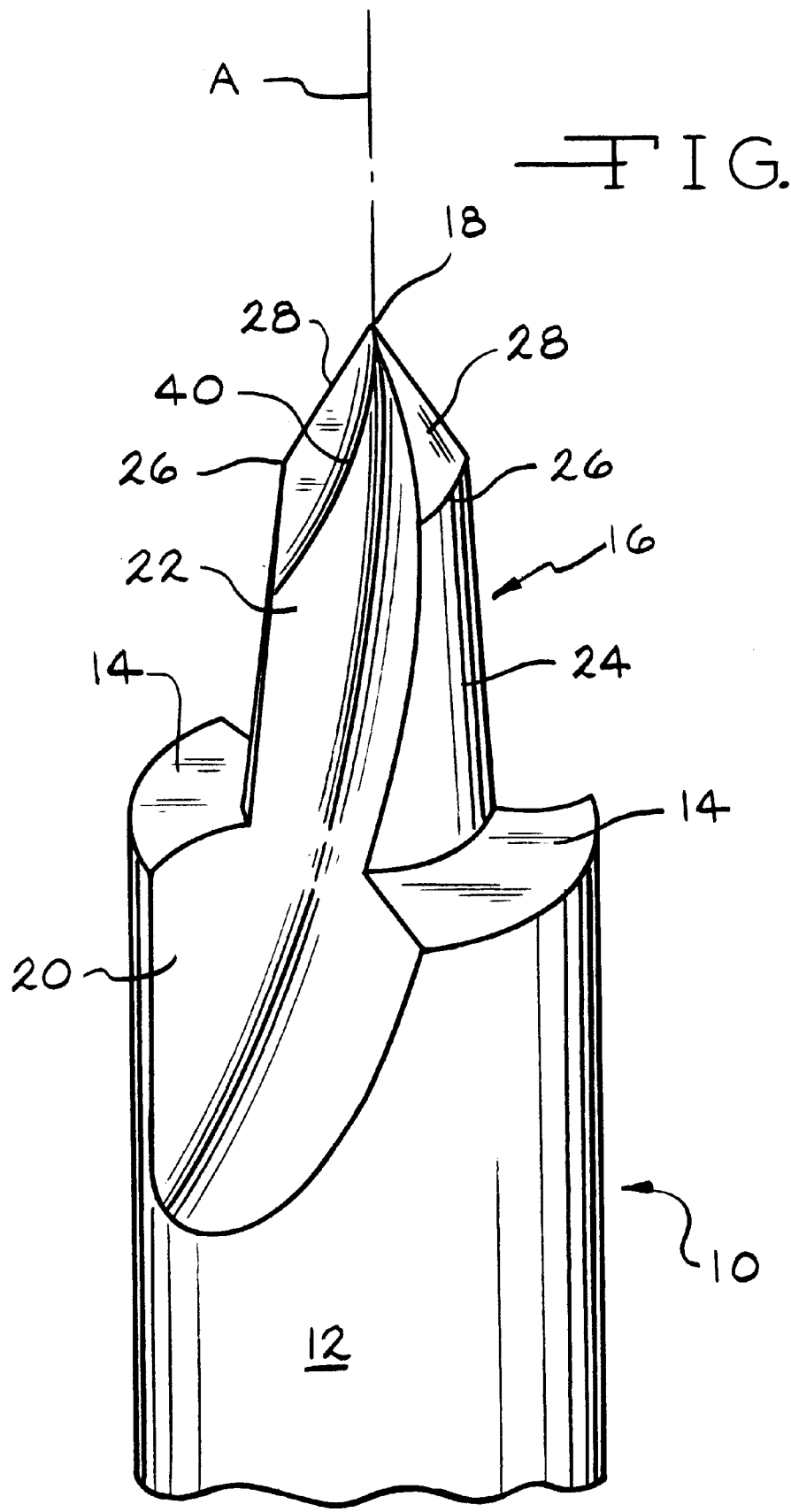
FIG. 2 is perspective view of the engraving tool taken from a different angle.
Figure 3:
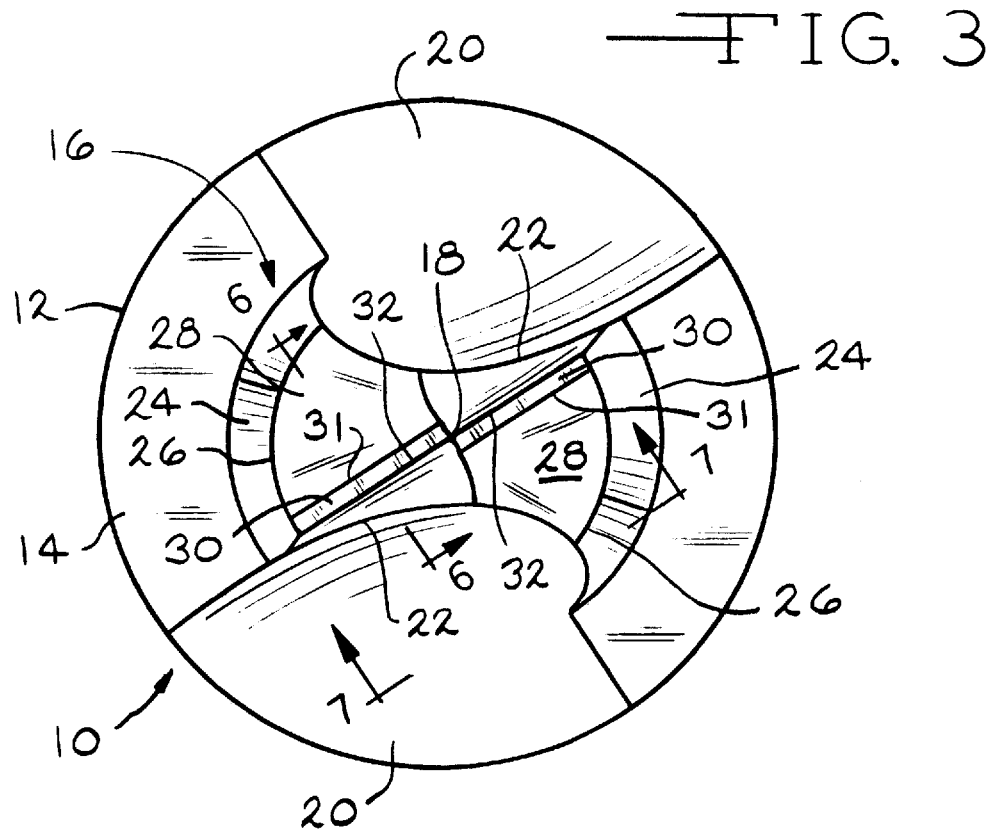
FIG. 3 is an end view of the engraving tool of the present invention.

The end portion 16 has a pair wall sections 24 on opposite sides of the axis A. Each wall section 24 defines a section of a cone and tapers inwardly toward the axis A in a direction from the shoulder 14 toward the tip 18. The end portion 16 also has a pair of flutes 22 on opposite sides of the axis A from one another. Each of the flutes 22 of the end portion 16 is an extension of one of the flutes 20 modified as hereinafter described. As can be seen in FIGS. 1–3, the flutes 22 extend substantially to the tip 18 and, in cross-section, are concave and each wall section 24 defines an arcuate path between the flutes 22. As can be seen most clearly from FIG. 3, the end portion 16 is substantially thinner as measured across the flutes 22 than when measure between the wall sections 24.

The wall sections 24 do not extend completely to the tip 18, but rather extend to a line of juncture 26. In the area between the line of juncture 26 and the tip 18, there are a pair of wall section extensions or facets 28, each joined to one of the wall sections 24 at the line of juncture 26. The line of juncture 26 for an engraving tool having a 0.25 inch diameter shaft 12 lies on a circle having a diameter of 0.050±0.02 inch. The intersection of the wall sections 24 with the shoulder 14 lies on a circle having a diameter 0.10±0.02 inch.

Figure 6:
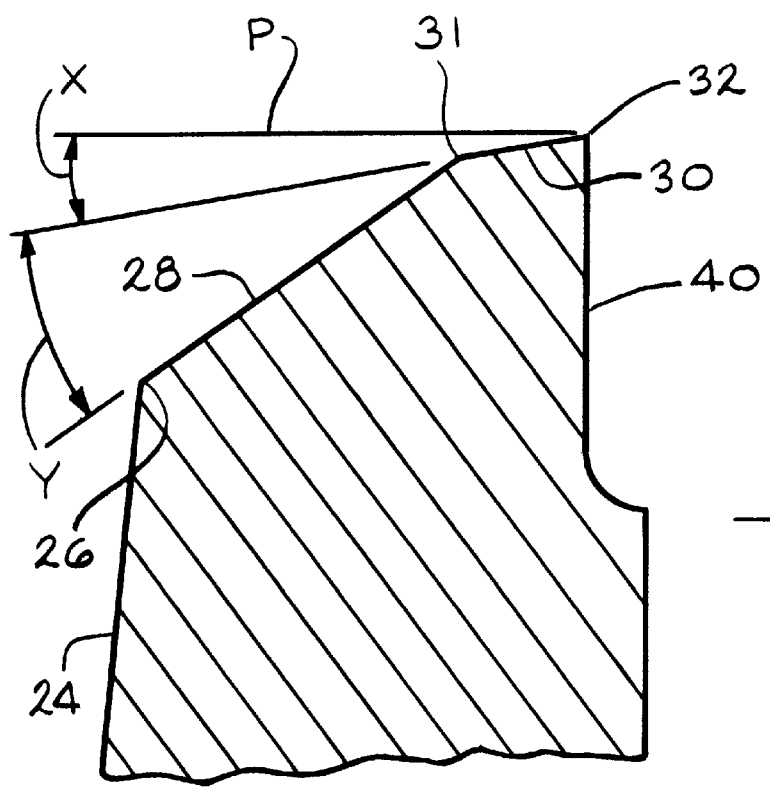
FIG. 6 is an enlarged sectional view taken through line 6—6 of FIG. 3.
Figure 7:
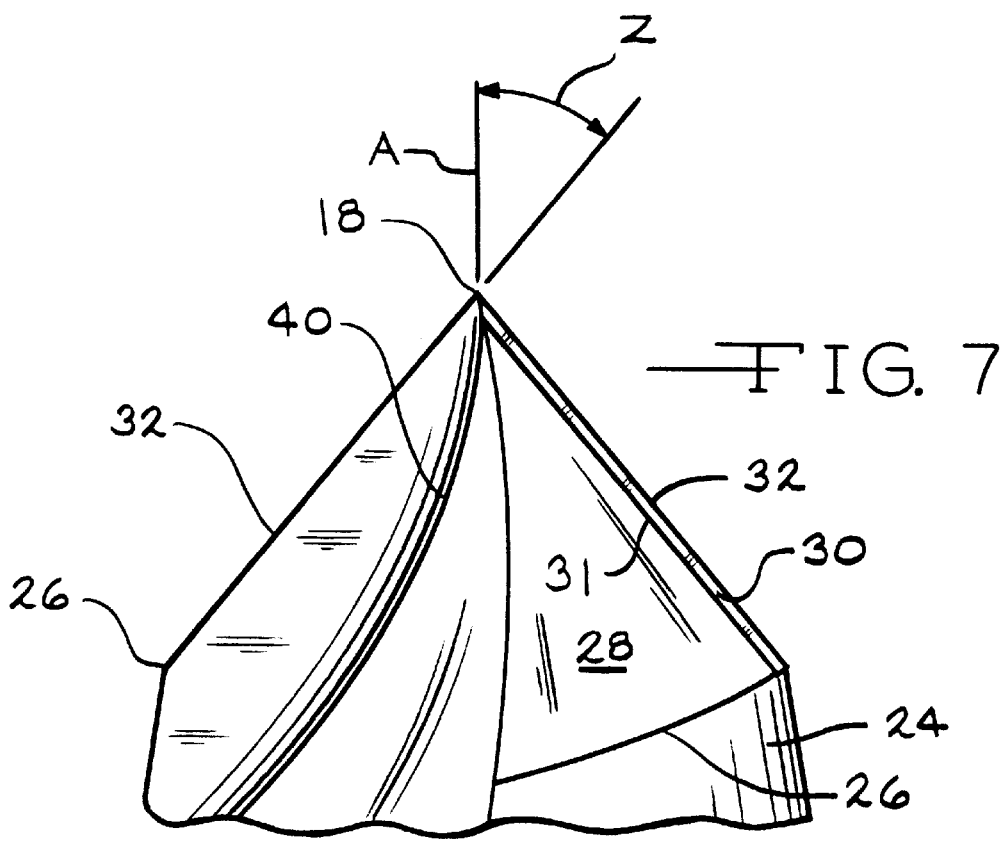
FIG. 7 is an enlarged view in the direction of line 7—7 of FIG. 3.

Between each of the wall section extensions 28 and the tip 18 is a second extension 30, each of which, as viewed in the direction of FIG. 6, is disposed at an angle designated X in the range of 10° to 20° relative to a plane P perpendicular to axis A. As viewed in the direction of FIG. 6, each wall section extension 28 is at an angle Y relative to the second extension 30 adjacent thereto, such angle Y being in the range of 20° to 30°. Thus, the angle of the wall section extensions 28 is in 30 the range of 30° to 50° relative to the plane P. Each second extension 30 slopes upwardly from a line of intersection 31 with its adjacent wall section extension 28 to a cutting edge 32. Each cutting edge 32 is disposed at an angle (designated Z in FIG. 7) in the range of 35° to 50° relative to the axis A. The uppermost points of the respective cutting edges 32 define the tip 18; however, the respective second extensions 30 and lines of intersection 31 lie on opposite sides of a plane extending along the axis A and passing through the cutting edges 32.

Figures 4, 5:
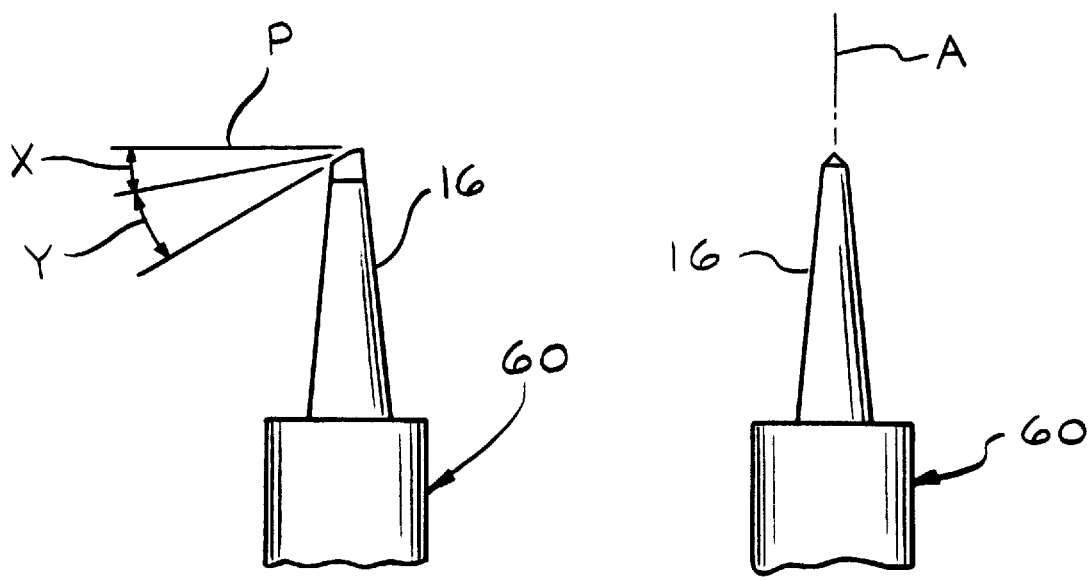
FIG. 4 is an elevational view showing angular cuts made on a workpiece in one rotational direction in forming the engraving tool of the present invention.
FIG. 5 is a view similar to FIG. 4 showing the workpiece rotated 90° about its axis.

In grinding the end portion 16, the first grind is made at the angle X as shown in FIGS. 4 and 6. Then a second grind is made at the angle Y to form the wall section extensions or facets 28. Thereafter, the flutes 22 are further ground to form an additional recess 40 (see FIGS. 6 and 7) which provides additional clearance and further enhances the ability of the engraving tool 10 to eject chips formed during engraving from the engraving site.

The engraving tool 10 of the present invention is particularly effective in permitting chips developed during the engraving process to flow into the flutes for expulsion out of the work area. The wall section extensions 28, the disposition of the second extensions 30 and the positioning of the cutting edges 32 and the additional recesses 40 are particularly effective in giving clearance for the chips to move into the flutes 22 and from there into the flutes 20 for removal from the work area. As a result, the chips are not present at the work area in any significant amount to slow up the engraving process or to add to the wear on the engraving tool. The design permits engraving at significantly higher feed rates than prior art engraving tools, even ones having diamond tips. Additionally, the design of the engraving tool of the present invention is such that the life of the engraving tool is greatly extended over prior art engraving tools.

The engraving tool of the present invention is an all metal device with the preferred metal being carbide steel such as that used in a combined drill and countersink sold by ULTRA Tool International Inc. under its Part No. 560 390. It is within the contemplation of the present invention, however, that the engraving tool 10 could be coated with an appropriate coating which will further extend the life of the tool. For example, a titanium aluminum nitride coating, such as one sold by Balzers Tool Coating, Inc., North Tonawanda, N.Y., and sold under the mark "Balinit X.TREME" or "Balinit FUTURA" may be used.

Many modifications will become readily apparent to those skilled in the art. Accordingly, the scope of the present invention should be determined solely by the scope of the claims appended hereto.

We claim:

1. An engraving tool comprising
   (a) a shaft portion (12) extending along an axis;
   (b) an end portion (16) extending from a base (14) at said shaft portion to a tip (18), said end portion (16) including
      (i) a pair of flutes (22), one on each side of said axis, extending from said base toward said tip (18), each of said flutes (22), in cross section, defining a concave curve,
      (ii) a pair of wall sections (24) between said flutes (22), each said wall section (24) being outwardly convex and tapering inwardly toward said axis in a direction extending from said base (14) toward said tip (18) and terminating at a line of juncture (26) spaced from said tip (18), and
      (iii) a wall section extension (28, 30) extending from each wall section (24) from said line of juncture (26) toward said tip (18), each said wall section extension including a first part (28) extending from said line of juncture (26), said first part (28) being so disposed that a cross section taken therethrough on a plane extending along said axis is at an angle in the range of 30° to 50° relative to a plane perpendicular to said axis and a second part (30) extending from said first part (28), said second part (30) being so disposed that a cross section taken therethrough on a plane extending along said axis is at an angle in the range of 10° to 20° relative to a plane perpendicular to said axis, each said second part (30) extending to a cutting edge (32), each said cutting edge (32) being disposed at an angle toward said axis, said cutting edges (32) lying substantially on the same plane extending along said axis, one of said second parts (30) lying on one side of said plane and the other of said second parts (30) lying on the other side of said plane.

2. An engraving tool according to claim 1 wherein each of said flutes (22), in the area of said tip (18), has a recess (40) providing clearance for chips to move into said flutes.

3. An engraving tool according to claim 1 wherein each of said cutting edges (32) is disposed at an angle in the range of 35° to 50° relative to said axis.

4. An engraving tool comprising
   (a) a shaft portion (12) extending along an axis;
   (b) an end portion (16) extending from a base at said shaft portion to a tip (18), said end portion (16) including
      (i) a pair of flutes (22), one on each side of said axis, extending from said base toward said tip (18), each of said flutes (22), in cross section, defining a concave curve,
      (ii) a pair of wall sections (24) between said flutes, each said wall section (24) being outwardly convex and tapering inwardly toward said axis in a direction extending from said base (14) toward said tip (18) and terminating at a line of juncture (26) spaced from said tip (18), and
      (iii) wall section extensions (28, 30) between said line of juncture (26) and said tip (18), each said wall section extension including a first part (28) extending from said line of juncture (26), said first part (28) being disposed such that a cross section taken therethrough on a plane extending along said axis is at an angle in the range of 30° to 50° relative to a plane perpendicular to said axis and a second part (30) extending from said first part (28), said second part (30) extending to a cutting edge (32), each said cutting edge (32) being disposed at an angle relative to said axis in the range of 30° to 50°, said cutting edges (32) lying substantially on the same plane extending along said axis, one of said second parts (30) lying on one side of said plane and the other of said second parts (30) lying on the other side of said plane.

5. An engraving tool according to claim 4 wherein each of said flutes (22), in the area of said tip (18), has a recess (40) providing clearance for chips to move into said flutes.

6. An engraving tool according to claim 4 wherein each said second part (30) is so disposed that a cross section taken therethrough on a plane extending along said axis is at an angle in the range of 10° to 20° relative to a plane perpendicular to said axis.

7. An engraving tool comprising
   (a) a shaft portion (12) extending along an axis;
   (b) an end portion (16) extending from a base (14) at said shaft portion to a tip (18), said end portion (16) including
      (i) a pair of flutes (22), one on each side of said axis, extending from said base toward said tip (18), each of said flutes (22), in cross-section, defining a concave curve,
      (ii) a pair of wall sections (24) between said flutes (22), each said wall section (24) being outwardly convex and tapering inwardly toward said axis in a direction extending from said base (14) toward said tip (18) and terminating at a line of juncture (26) spaced from said tip (18), and
      (iii) a wall section extension (28, 30) extending from each wall section (24) from said line of juncture (26) toward said tip (18), each said wall section extension including a first part (28) extending from said line of juncture (26), said first part (28) being so disposed that a cross section taken therethrough on a plane extending along said axis is at an angle in the range of 30° to 50° relative to a plane perpendicular to said axis and a second part (30) extending from said first part (28), said second part (30) being so disposed that a cross section taken therethrough on a plane extending along said axis is at an angle in the range of 10° to 20° relative to a plane perpendicular to said axis, each said second part (30) extending to a cutting edge (32), each said cutting edge (32) extending at an angle in the range of 35° to 50° toward said axis, said tip (18) defined by the intersection of each said cutting edge (32) with said axis.

8. An engraving tool according to claim 7 wherein each of said flutes (22), in the area of said tip (18), has a recess (40) providing clearance for chips to move into said flutes.

9. An engraving tool according to claim 7 wherein said cutting edges (32) lying substantially on the same plane extending along said axis, one of said second parts (30) lying on one side of said plane and the other of said second parts (30) lying on the other side of said plane.

* * * * *